United States Patent [19]

Konno

[11] Patent Number: 4,792,485

[45] Date of Patent: Dec. 20, 1988

[54] ELECTROSTATIC RECORDING SHEET

[75] Inventor: Takeshi Konno, Shizuoka, Japan

[73] Assignee: Fuji Photo Film Co., Ltd., Kanagawa, Japan

[21] Appl. No.: 172,179

[22] Filed: Mar. 23, 1988

[30] Foreign Application Priority Data

Mar. 24, 1987 [JP] Japan .................................. 62-70007

[51] Int. Cl.$^4$ .................................................. B32B 5/16

[52] U.S. Cl. .................................. 428/327; 346/135.1; 427/121; 428/206; 428/207; 428/211; 428/513; 428/537.5

[58] Field of Search ...................... 346/135.1; 427/121; 428/206, 207, 211, 513, 537.5, 327

[56] References Cited

U.S. PATENT DOCUMENTS 3,620,831 11/1971 Gould .................................. 427/121

*Primary Examiner*—George F. Lesmes
*Assistant Examiner*—P. R. Schwartz
*Attorney, Agent, or Firm*—Sughrue, Mion, Zinn, Macpeak & Seas

[57] ABSTRACT

An electrostatic recording sheet comprising a support provided thereon a conductive layer and a dielectric layer, in this order, with the dielectrics layer containing polypropylene particles with a specified size distribution and exhibiting excellent moisture resistance and high transparency.

8 Claims, No Drawings

ELECTROSTATIC RECORDING SHEET

FIELD OF THE INVENTION

The present invention concerns an electrostatic recording sheet. As a result of recent developments of CAD (or computer aided design) and CAM (or computer aided manufacturing), it has become more and more frequent to record outputs of these systems utilizing electrostatic electrography. The invention is particularly concerned with an electrostatic recording sheet which uses paper or a plastic film as a support, and which has improved moisture resistance and transparency.

BACKGROUND OF THE INVENTION

An electrostatic recording sheet conventionally comprises a support, a conductive layer provided on the support, and a dielectric layer provided on the conductive layer. The dielectric layer (i.e., an insulating layer) conventionally comprises a soluble binder, e.g., polyvinyl acetate, polystyrene, polyvinyl chloride, polyester, polymethacrylates, or polyvinylidene chloride. Fine particles are dispersed into such a binder for the purposes of making improvements in discharge-in-air characteristics and writing facility. As these particles, inorganic fillers such as silica, clay, alumina or the like have so far been used, as described in Japanese Patent Publication No. 33709/81 (corresponding to U.S. Pat. Nos. 3,711,859 and 3,657,005).

However, an electrostatic recording sheet which contains such inorganic fillers in the dielectric layer, though acquires improved writing facility, suffers form want of moisture resistance. Namely, when recording is carried out in an atmosphere of high humidity, the density of the image obtained is low, or there is a blur on the image obtained. In regions where humidity varies greatly throughout the year, a recording sheet poor in moisture resistance is deficient in respect to practical use. Such being the case, an electrostatic recording sheet with stable recording characteristics regardless of any change in humidity is most desirable.

In addition, electrostatic recording has found increased application lately in the fields of IC (Integrated Circuit) and LSIC (Large-Scale Integrated Circuit). Consequently, greater transparency and dimensional stability are demanded, and the use of a plastic film instead of paper as the support has come to be required. When conventional inorganic pigments or the like are used as the fine particles, haze of the recording sheet is high because of their braod size distribution and low transparency. As a result, the recording sheet is not sufficient in respect to transparency. Since the check of drawings in the field of IC and LSIC is carried out by superimposing three of four films on one anther, high haze is all the more undesirable.

As described above, conventional electrostatic recording sheets in which inorganic fillers are used have problems in respect to moisture resistance and transparency.

SUMMARY OF THE INVENTION

As the result of extensive investigation of the above-described problems, it has been found that both moisture resistance and transparency of an electrostatic recording sheet can be improved by employing polypropylene particles in place of inorganic fillers.

When polypropylene particles are used, not only ar recording characteristics improved under high humidity, but also the resulting sheet can show excellent recording characteristics under ordinary humidity. In addition, the resulting sheet has reduced haze, and is thus suitable for use in the fields of IC and LSIC.

DETAILED DESCRIPTION OF THE INVENTION

Polypropylene particles whose particle sizes have such a distribution that those having a particle size of 5 microns or less comprise not more than 15 wt % of the whole polypropylene particles, and moreover those having a particle size of 13 microns or less amount to not less than 65 wt % of the whole are preferred in respect of both discharge characteristic and transparency. When polypropylene particles measuring 5 to 13 microns in their individual diameters amount particularly to not less than 70 wt% of the whole, the use of particles of such kind can produce the most excellent result. The maximum particle size of the polypropylene particles is preferably about 25 $\mu$. The particle size can be defined in accordance with a Coulter counter method. It is effective to use the polypropylene particles in the form of a dispersion in the dielectric layer, in which an organic solvent like toluene is employed as the dispersion medium, because a problem of secondary aggregation can be prevented from occurring.

An appropriate amount of polypropylene particles added to a dielectric layer is within the range of 0.3 wt % to 12.5 wt % by weight of solids in the dielectric layer. When importance is attached to transparency in particular, the amount added preferably ranges from 0.3 to 7.5 wt % by weight of solids in the dielectric layer.

Since it is an indispensable condition in the present invention that the dielectric layer functions as an insulator, ionic polymers and polymers of the kind which dissociate upon moisture absorption are unfit as a material of the dielectric layer, and it is necessary for ionic substances to be present in the dielectric layer to a small extent. Accordingly, polymers soluble in organic solvents are prferably employed.

Specific examples of such organic solvent soluble polymers include homo- and copolymers prepared from vinyl chloride, vinylidene chloride, styrene, methylstyrene, butadiene, alkyl esters of acrylic acid (with an alkyl moiety containing 1 to 4 carbon atoms), vinyl acetate, acrylonitrile, isobutylene, allyl acetate etc; soluble polyesters; polycarbonates; cellulose derivatives such as ethyl cellulose, cellulose acetate, cellulose propionate, etc.; polyvinyl butyral; polyvinyl formal; and the like.

The dielectric layer preferably has a dry thickness of about 1.4 to 3.5 microns and a volume resistivity of about $10^{14}$ Ω·cm or more.

As for the conductive material to form the conductive layer, electron-conducting materials insensitive to changes in humidity are preferably employed. Specific examples of such materials include conductive zinc oxide obtained by doping zinc oxide with a foreign metal, conductive stannic oxide obtained by doping ordinary stannic oxide with foreign metal, cuprous iodide, and so on. In order to enhance dispersibility and conductivity, these materials, though generally obtainable in the powdery form, are preferably ground in advance to form fine grains measuring 2 microns or less in diameter using a ball mill, an attriter or the like.

The conductive layer preferably has a thickness of about 0.5 μ and a surface resistivity of about $10^5$ to $10^8$ Ω.

Examples of macromolecular bonding agents suitable as a binder for conductive materials include polyvinyl alcohol, hydroxyethyl cellulose, styrene-maleic anhydride copolymer, gelatin and so on.

As examples of solvents suitable for coating the foregoing conductive materials, mention may be made of ketones such as toluene, acetone, methyl ethyl ketone, methyl isobutyl ketone, cyclohexanone, etc.; ethers such as tetrahydrofuran, dioxane, etc.; esters such as methyl acetate, ethyl acetate, propyl acetate, butyl acetate, etc.; chlorinated hydrocarbons such as dichloromethane, dichlorethane, etc.; alcohols such as methanol, ethanol, cyclohexanol, propanol, etc.; and so on.

For the purpose of increasing the adhesiveness between the support and the conductive layer, or between the conductive layer and the dielectrics layer, the surface of the support or that of the conductive layer may be subjected to a corona discharge processing, a glow discharge processing, a flame processing, or an ultraviolet irradiation processing.

The general principle of the electrostatic recording sheet according to the present invention is described, for example, in *HARD COPY TECHNOLOGY,* published by Nippon Kogyo Gijutsu Center (JIEC), June (1981).

Now, the present invention is illustrated in more detail by reference to the following examples. Unless otherwise indicated herein, all parts, percents, ratios and the like are by weight.

EXAMPLE 1

A biaxially drawn, thermoset polyethylene terephthalate film measuring 100 microns in thickness was subjected to a glow discharge processing, and thereon was coated a solution with the following composition as a conductive layer. The layer coated was dried at 130° C. for 10 minutes.

| | |
|---|---|
| Gelatin | 15 pts. wt. |
| Stannous oxide doped with antimony (mean grain size: 0.2 micron, Sb content: 5 %) | 55 pts. wt. |
| Sodium salt of 2,4-dichloro-6-hydroxy-s-triazine | 0.03 pt. wt. |
| Water | 1,000 pts. wt. |

On the conductive layer was coated a solution with the following composition to provide a dielectric layer. The layer coated was dried at 100° C. for 10 minutes to a dry coverage of 3.1 microns.

| | |
|---|---|
| Linear polyester (VYLON 200, produced by Toyo Spinning Co., Ltd.) | 50 pts. wt. |
| Rosin ester (produced by Arakawa Kagaku Co., Ltd.) | 3 pts. wt. |
| Methyl ethyl ketone | 300 pts. wt. |
| Toluen | 18 pts. wt. |
| Unistol R100 (15% toluene dispersion of polypropylene particles, in which particles measuring 5 microns or less in size and those measuring 12 microns or less in size comprise 7.5% and 85% of the whole, respectively; produced by Mitsui Petrochemical Industries Ltd.) | 8.8 pts. wt. |

On the thus prepared, transparent electrostatic recording sheet, recording was carried out using an electrostatic plotter (VERSATEC 7472) under each of two conditions, one being 25° C., 65% RH, and the other being 30° C., 80% RH. Densities of the recorded images and the backgrounds were measured with a Macbeth densitometer. A degree of haze of the non-image portion of the sheet was determined by passing it through a hazeometer of integrating sphere type (TYPE: SEP-H-S, made by Nippon Seimitsu Kohgaku K.K). The results obtained are shown in Table 1 below.

COMPARATIVE EXAMPLE 1

Another recording sheet was prepared in the same manner as in Example 1, except that 1.32 parts by weight of aluminum oxide was used in place of Unistol.

COMPARATIVE EXAMPLE 2

Still another recording sheet was prepared in the same manner as in Example 1, except that 1.32 parts by weight of silica powder was used in place of Unistol.

TABLE 1

| | 25° C., 65% RH | | 30° C., 80% RH | | |
|---|---|---|---|---|---|
| Run No. | Record Density | Background Density | Record Density | Background Density | Haze Degree |
| Example 1 | 1.28 | 0.15 | 1.18 | 0.15 | 19.8% |
| Comparative Example 1 | 1.08 | 0.17 | 0.78 | 0.17 | 29.0% |
| Comparative Example 2 | 1.07 | 0.17 | 0.81 | 0.16 | 31.0% |

As can be seen from the data in Table 1, the electrostatic recording sheet of the present invention, which contained polypropylene particles in the dielectric layer, had high image density, small dependence on temperature, reduced fog in the background area, and high transparency.

While the invention has been described in detail and with reference to specific embodiments thereof, it will be apparent to one skilled in the art that various changes and modifications can be made therein without departing from the spirit and scope thereof.

What is claimed is:

1. An electrostatic recording sheet comprising at least a support, a conductive layer provided on the support, and a dielectric layer provided on the conductive layer, said dielectric layer containing polypropylene particles.

2. An electrostatic recording sheet as in claim 1, wherein not more than 15 wt % of said polypropylene particles have a particle size of 5 microns or less, and those having a particle size of 13 microns or less amount to not less than 65 wt % of all of the polypropylene particles.

3. An electrostatic recording sheet as in claim 1, where the support is a paper or a plastic.

4. An electrostatic recording sheet as in claim 3, wherein the polypropylene particles contained in the dielectric layer are contained in an amount of from 0.3 wt % to 7.5 wt % by weight of solids in the dielectric layer.

5. An electrostatic recording sheet as in claim 1, wherein the polypropylene particles are dispersed in the dielectric layer.

6. An electrostatic recording sheet as in claim 1, wherein 70 wt % or more of the total weight of the polypropylene particles are of a diameter of 5 to 13 microns.

7. An electrostatic recording sheet as in claim 1, wherein the polypropylene particles contained in the dielectric layer are contained in an amount of from 0.3 wt % to 12.5 wt % by weight of solids in the dielectric layer.

8. An electrostatic recording sheet as in claim 1, wherein the dielectric layer is comprised of an organic solvent soluble polymer.

* * * * *